(12) United States Patent
Kokido (10) Patent No.: US 10,800,395 B2
(45) Date of Patent: *Oct. 13, 2020

(54) DRIVING ASSISTANCE APPARATUS AND DRIVING ASSISTANCE METHOD

(71) Applicant: Mitsubishi Electric Corporation, Tokyo (JP)

(72) Inventor: Noritaka Kokido, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 351 days.

This patent is subject to a terminal disclaimer.

(21) Appl. No.: 15/884,705

(22) Filed: Jan. 31, 2018

(65) Prior Publication Data

US 2018/0148035 A1    May 31, 2018

Related U.S. Application Data

(63) Continuation of application No. 15/095,568, filed on Apr. 11, 2016, now Pat. No. 9,914,446.

(30) Foreign Application Priority Data

Oct. 26, 2015    (JP) .................................. 2015-209531

(51) Int. Cl.
*B60W 10/20*    (2006.01)
*B60W 10/06*    (2006.01)
(Continued)

(52) U.S. Cl.
CPC ............ *B60W 10/20* (2013.01); *B60W 10/06* (2013.01); *B60W 10/184* (2013.01); *B60W 30/10* (2013.01); *B60W 30/143* (2013.01); *B60W 30/18163* (2013.01); *B60W 2050/143* (2013.01); *B60W 2420/42* (2013.01); *B60W 2520/10* (2013.01); *B60W 2554/801* (2020.02);
(Continued)

(58) Field of Classification Search
CPC .... B60W 10/20; B60W 10/06; B60W 10/184; B60W 30/10; B60W 30/143; B60W 30/18163
See application file for complete search history.

(56) References Cited

U.S. PATENT DOCUMENTS

2015/0210274 A1    7/2015    Clarke et al.

FOREIGN PATENT DOCUMENTS

JP    2005-352636 A    12/2005
JP    2006-331304 A    12/2006
(Continued)

OTHER PUBLICATIONS

Communication dated Jul. 5, 2016 from the Japanese Patent Office in counterpart Application No. 2015-209531.

*Primary Examiner* — Michael D Lang
(74) *Attorney, Agent, or Firm* — Sughrue Mion, PLLC; Richard C. Turner (57) ABSTRACT

Provided is a driving assistance apparatus configured to determine whether or not an own vehicle driving lane is a merging lane based on a result of identifying the merging lane from a lane reduction sign detected in a vehicle front image and a result of identifying a merged lane direction with respect to the own vehicle driving lane from separation lines on both sides of the own vehicle driving lane that are detected in the vehicle front image, and to control driving of an own vehicle in accordance with the determination result and vehicle condition information of the own vehicle.

14 Claims, 10 Drawing Sheets

(51) Int. Cl.
*B60W 10/184* (2012.01)
*B60W 30/10* (2006.01)
*B60W 30/14* (2006.01)
*B60W 30/18* (2012.01)
*B60W 50/14* (2020.01)

(52) U.S. Cl.
CPC ... *B60W 2554/804* (2020.02); *B60W 2720/10* (2013.01); *B60W 2754/30* (2020.02)

(56) References Cited

FOREIGN PATENT DOCUMENTS

| | | |
|---|---|---|
| JP | 2007-145095 A | 6/2007 |
| JP | 2009-109404 A | 5/2009 |
| JP | 2010-231561 A | 10/2010 |
| JP | 2011-148479 A | 8/2011 |
| JP | 2014-044744 A | 3/2014 |

DRIVING ASSISTANCE APPARATUS AND DRIVING ASSISTANCE METHOD

CROSS-REFERENCE TO RELATED APPLICATIONS

This application is a continuation of U.S. patent application Ser. No. 15/095,568, filed on Apr. 11, 2016, in the U.S. Patent and Trademark Office, which claims priority from Japanese Patent Application No. 2015-209531, filed on Oct. 26, 2015, in the Japanese Intellectual Property Office, the disclosures of which are incorporated herein by reference in their entireties.

BACKGROUND OF THE INVENTION

1. Field of the Invention

The present invention relates to a driving assistance apparatus and a driving assistance method for providing appropriate driving assistance to a driver of a vehicle traveling on a merging lane.

2. Description of the Related Art

Hitherto, there have been proposed a large number of driving assistance technologies for avoiding traffic accidents of automobiles by giving assistances to drivers' function such as recognition, decision, or operation (for example, see Japanese Patent Application Laid-open No. 2005-352636 and Japanese Patent Application Laid-open No. 2014-44744). Specific examples of the above-mentioned driving assistance technologies include the following control.

First, there is known Adaptive Cruise Control (ACC) control, in which a camera or the like installed in a vehicle is used to keep a distance between an own vehicle and a forward vehicle at a certain length or longer and at the same time maintain a vehicle speed at a set speed. Secondly, there is known Lane Keep Assist (LKA) control, in which separation lines of a driving lane on which the vehicle is traveling are detected and a driver's steering wheel operation is assisted based on the detection result. Thirdly, there is known Lane Departure Warning (LDW) control, in which the driver is warned of a possibility of the vehicle departing from the driving lane when such a possibility exists.

SUMMARY OF THE INVENTION

Then, when the ACC control is performed in a case where there is no vehicle ahead of the own vehicle because the forward vehicle has just changed a merging lane while the own vehicle is traveling on that lane in a lane reduction situation of a road, there is a possibility of the own vehicle performing an acceleration operation. Thus, in this case, it is necessary to prevent the acceleration operation of the own vehicle.

Further, in a case where the own vehicle is traveling on the merging lane, the LKA control and the LDW control need to be continued when the own vehicle continues to travel on the merging lane, whereas the LKA control and the LDW control need to be prohibited when the own vehicle is merging into a merged lane from the merging lane.

In this way, it is necessary to provide appropriate driving assistance to the driver of a vehicle traveling on a merging lane.

The present invention has been made to address the above-mentioned challenges, and has an object to acquire a driving assistance apparatus and a driving assistance method capable of providing appropriate driving assistance to the driver of a vehicle traveling on a merging lane.

According to one embodiment of the present invention, there is provided a driving assistance apparatus including: an image pickup unit configured to generate a vehicle front image by picking up an image of a front field of an own vehicle traveling on an own vehicle driving lane; a merging lane identification unit configured to detect a lane reduction sign in the vehicle front image generated by the image pickup unit, identify a merging lane based on the lane reduction sign, and generate an identification result as merging lane information; a merged lane direction identification unit configured to detect separation lines on both sides of the own vehicle driving lane in the vehicle front image generated by the image pickup unit, identify a merged lane direction with respect to the own vehicle driving lane based on the separation lines on both sides, and generate an identification result as merged lane direction information; an own vehicle driving lane determination unit configured to determine whether or not the own vehicle driving lane is the merging lane based on the merging lane information generated by the merging lane identification unit and the merged lane direction information generated by the merged lane direction identification unit; a vehicle condition detection unit configured to detect vehicle condition information of the own vehicle; and an own vehicle driving control unit configured to control driving of the own vehicle in accordance with the vehicle condition information detected by the vehicle condition detection unit and a result of determination by the own vehicle driving lane determination unit.

Further, according to one embodiment of the present invention, there is provided a driving assistance method, including: an image pickup step of generating a vehicle front image by picking up an image of a front field of an own vehicle traveling on an own vehicle driving lane; a merging lane identification step of detecting a lane reduction sign in the vehicle front image generated in the image pickup step, identifying a merging lane based on the lane reduction sign, and generating an identification result as merging lane information; a merged lane direction identification step of detecting separation lines on both sides of the own vehicle driving lane in the vehicle front image generated in the image pickup step, identifying a merged lane direction with respect to the own vehicle driving lane based on the separation lines on both sides, and generating an identification result as merged lane direction information; an own vehicle driving lane determination step of determining whether or not the own vehicle driving lane is the merging lane based on the merging lane information generated in the merging lane identification step and the merged lane direction information generated in the merged lane direction identification step; and an own vehicle driving control step of controlling driving of the own vehicle in accordance with vehicle condition information of the own vehicle and a result of determination in the own vehicle driving lane determination step.

According to the one embodiment of the present invention, the driving assistance apparatus is configured to determine whether or not the own vehicle driving lane is the merging lane based on the result of identifying the merging lane from a lane reduction sign detected in a vehicle front image and the result of identifying the merged lane direction with respect to the own vehicle driving lane from the separation lines on both sides of the own vehicle driving lane that are detected in the vehicle front image, and to control the driving of the own vehicle in accordance with the determination result and the vehicle condition information of the own vehicle. With this, it is possible to acquire the driving assistance apparatus and the driving assistance method capable of providing appropriate driving assistance to the driver of a vehicle traveling on a merging lane.

DETAILED DESCRIPTION OF THE PREFERRED EMBODIMENTS

Now, a description is given of a driving assistance apparatus and a driving assistance method according to preferred embodiments of the present invention with reference to the drawings. Note that, in the description of the drawings, the same or corresponding parts are denoted by the same reference symbols, and an overlapping description thereof is omitted.

First Embodiment

Figure 1:
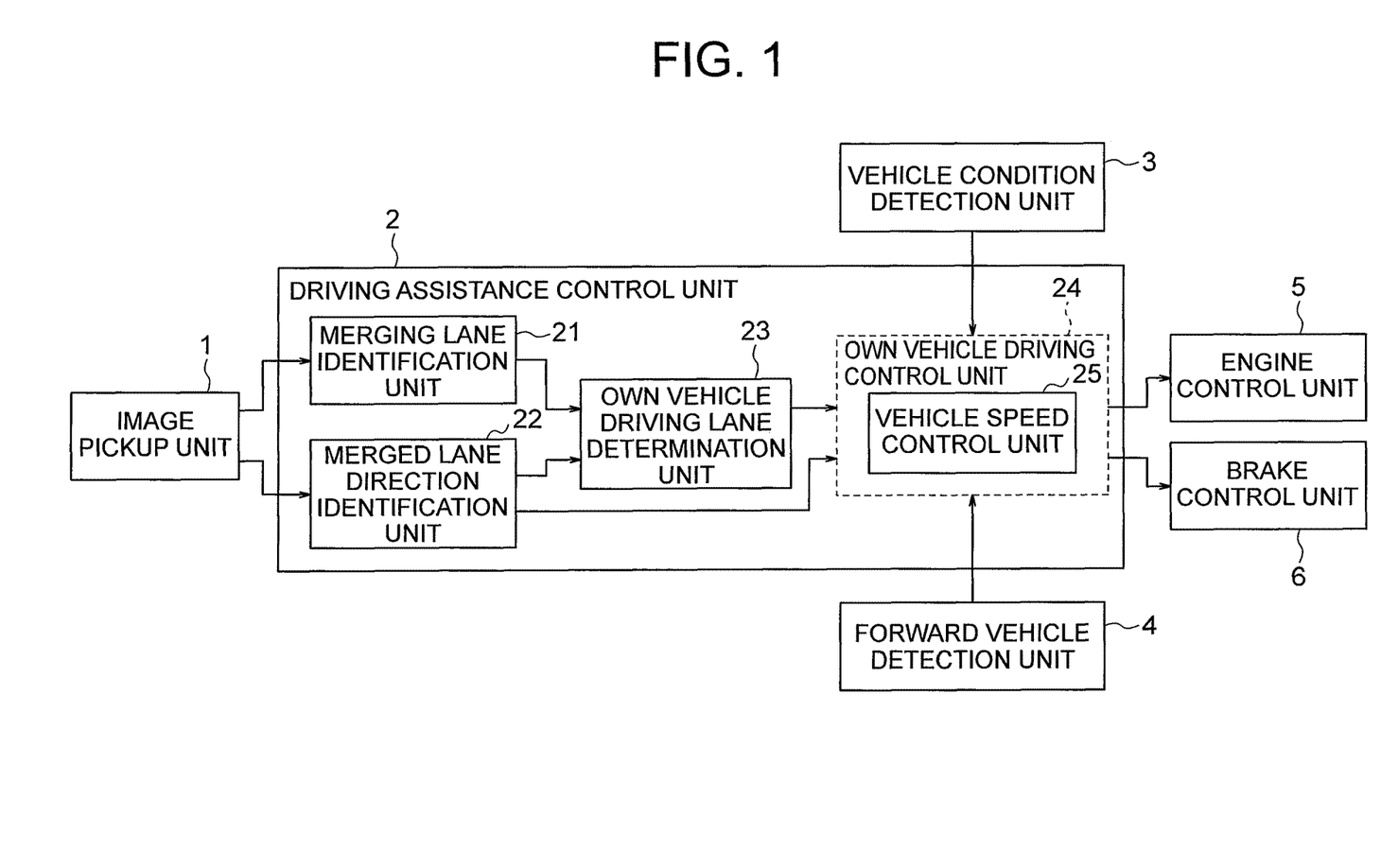
FIG. 1 is an overall block diagram for illustrating a driving assistance apparatus according to a first embodiment of the present invention.

FIG. 1 is an overall block diagram for illustrating a driving assistance apparatus according to a first embodiment of the present invention. The driving assistance apparatus of FIG. 1 includes an image pickup unit 1, a driving assistance control unit 2, a vehicle condition detection unit 3, and a forward vehicle detection unit 4. In FIG. 1, an engine control unit 5 and a brake control unit 6 to be controlled by the driving assistance control unit 2 are illustrated together with the above-mentioned components.

The image pickup unit 1 picks up an image of a front field of an own vehicle traveling on an own vehicle driving lane to generate and output a vehicle front image. The image pickup unit 1 is formed of, for example, one or a plurality of cameras. Further, for example, an optical camera or an infrared camera may be used as the camera.

The driving assistance control unit 2 is realized by a processing circuit such as a CPU executing a program stored in a memory or a system LSI. The driving assistance control unit 2 includes a merging lane identification unit 21, a merged lane direction identification unit 22, an own vehicle driving lane determination unit 23, and an own vehicle driving control unit 24.

The merging lane identification unit 21 performs an image analysis on a vehicle front image acquired from the image pickup unit 1, to thereby detect a lane reduction sign for indicating lane reduction in an own vehicle traveling road.

Now, a description is given of examples of the lane reduction sign with reference to FIG. 2 to FIG. 7. FIG. 2 to FIG. 7 are schematic diagrams for illustrating the first to the sixth examples of the lane reduction sign to be detected by the merging lane identification unit 21 of FIG. 1, respectively.

Figure 2:
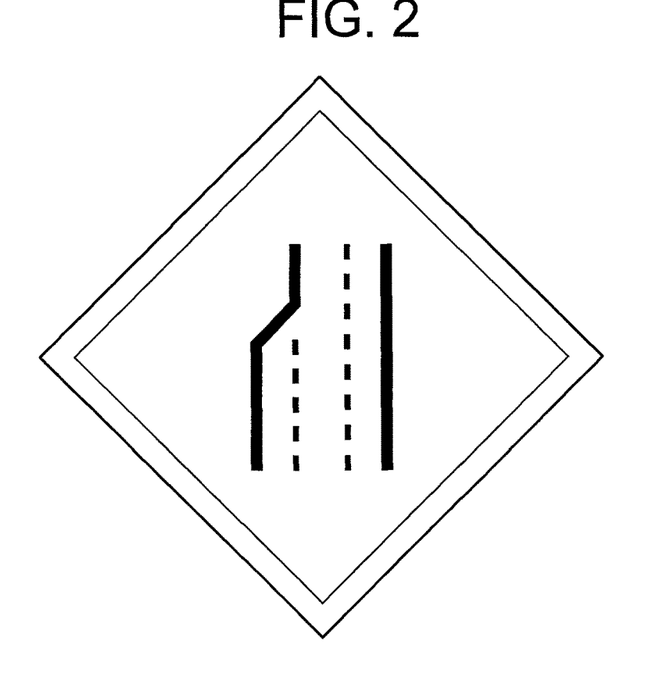
FIG. 2 is a schematic diagram for illustrating a first example of a lane reduction sign to be detected by a merging lane identification unit of FIG. 1.
Figure 3:
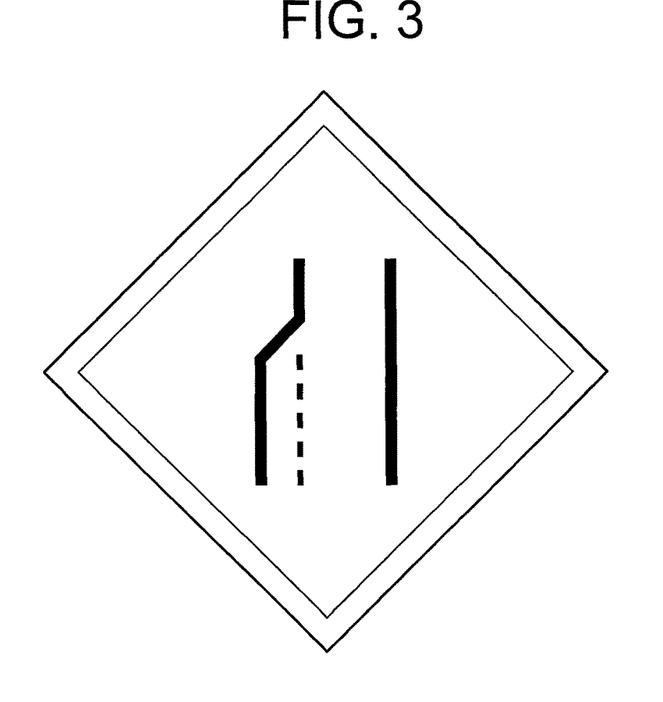
FIG. 3 is a schematic diagram for illustrating a second example of the lane reduction sign to be detected by the merging lane identification unit of FIG. 1.
Figure 4:
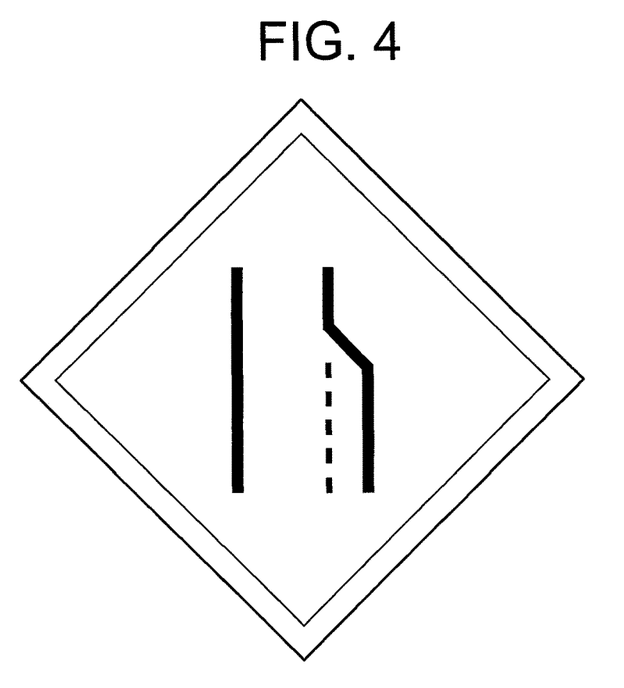
FIG. 4 is a schematic diagram for illustrating a third example of the lane reduction sign to be detected by the merging lane identification unit of FIG. 1.
Figure 5:
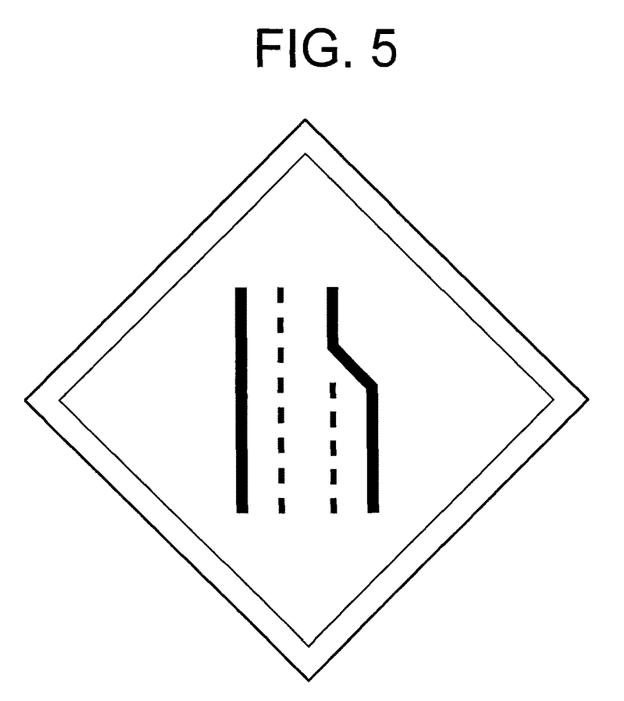
FIG. 5 is a schematic diagram for illustrating a fourth example of the lane reduction sign to be detected by the merging lane identification unit of FIG. 1.

Respective figures of FIG. 2 to FIG. 5 are illustrations of various kinds of traditional road signs for indicating lane reduction ahead in the road. For example, FIG. 2 is an illustration of a road sign for indicating that a left lane is the merging lane out of the left lane, a center lane, and a right lane in a road, and that the number of lanes is decreased from three to two ahead in the road.

Figure 6:
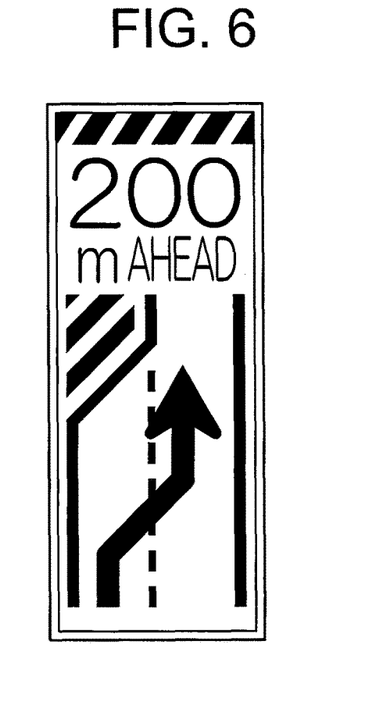
FIG. 6 is a schematic diagram for illustrating a fifth example of the lane reduction sign to be detected by the merging lane identification unit of FIG. 1.
Figure 7:
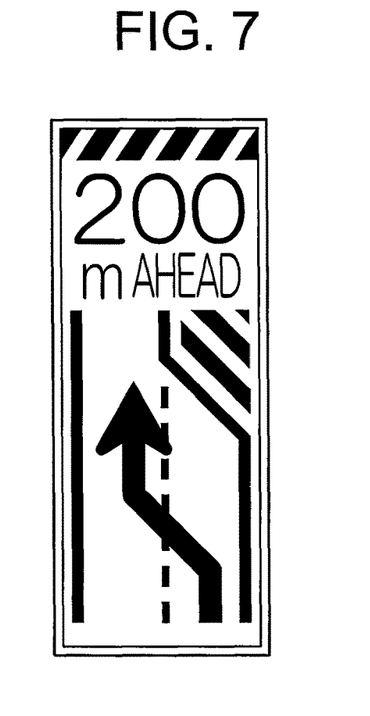
FIG. 7 is a schematic diagram for illustrating a sixth example of the lane reduction sign to be detected by the merging lane identification unit of FIG. 1.

Respective figures of FIG. 6 and FIG. 7 are illustrations of various kinds of construction signs for indicating lane reduction ahead in the road due to an ongoing road work. For example, FIG. 6 is an illustration of a construction sign for indicating that a left lane is the merging lane out of the left lane and a right lane in a road, and that the number of lanes is decreased from two to one 200 m ahead in the road.

As described above, it is possible to identify the number of lanes in a road and also identify which lane out of lanes in the road is the merging lane, namely, the position of the merging lane based on the shape of a figure depicted in the lane reduction sign for indicating the lane reduction.

The merging lane identification unit 21 identifies the merging lane based on the shape of a figure depicted in the lane reduction sign that has been detected from the vehicle front image. Specifically, the merging lane identification unit 21 identifies the number of lanes and the position of the merging lane in the road. Further, the merging lane identification unit 21 generates the identification result as merging lane information, and outputs this merging lane information.

In this case, for example, the following method is conceivable as a specific method of identifying the number of lanes and the position of the merging lane in the road to be performed by the merging lane identification unit 21.

That is, this method performs sobel filtering on the vehicle front image in each direction, and detects a triangle as a road sign candidate or a rectangle as a construction sign candidate from edge points. Then, this method performs pattern matching on the detected region with reference to road sign templates or construction sign templates that are stored in a storage unit (not shown) in advance, to thereby be able to identify the number of lanes indicated by the road sign or the construction sign and the position of the merging lane. Note that, the storage unit may store in advance lane reduction sign templates that may exist in Japan or in foreign countries as well as the lane reduction signs illustrated in FIG. 2 to FIG. 7 as templates for performing pattern matching.

Through configuration of the merging lane identification unit 21 described above, it is possible to accurately identify which of the left and right lanes is the merging lane. Further, it is possible to accurately identify the merging lane even when map information such as that of an automotive navigation system does not allow the lane reduction to be grasped such as when the map information is obsolete or the number of lanes is temporarily decreased due to a work.

The merged lane direction identification unit 22 performs an image analysis on the vehicle front image acquired from the image pickup unit 1, to thereby detect separation lines on both sides of the own vehicle driving lane. Specifically, the merged lane direction identification unit 22 detects the positions of the separation lines on both sides of the own vehicle driving lane on which the own vehicle is traveling and line types of those separation lines. Further, the merged lane direction identification unit 22 generates the detection result as separation line information, and outputs this separation line information.

Further, the merged lane direction identification unit 22 identifies a merged lane direction with respect to the own vehicle driving lane based on the line types of the separation lines on both sides of the own vehicle driving lane contained in the separation line information, generates the identification result as merged lane direction information, and outputs this merged lane direction information.

Figure 8:
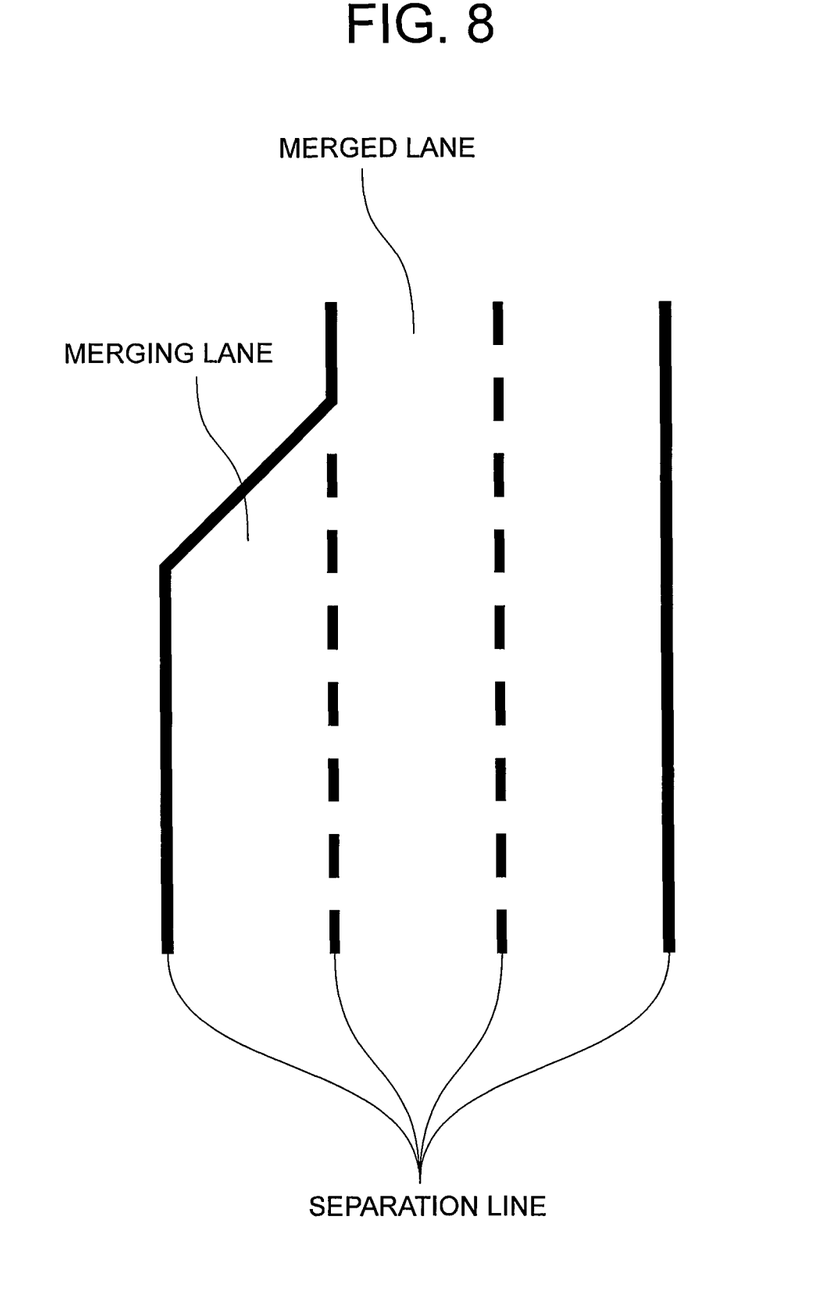
FIG. 8 is an explanatory diagram for illustrating a method of identifying a merged lane direction to be performed by a merged lane direction identification unit of FIG. 1.

Now, a description is given of a specific method of identifying the merged lane direction with respect to the own vehicle driving lane to be performed by the merged lane direction identification unit 22 with reference to FIG. 8. FIG. 8 is an explanatory diagram for illustrating the method of identifying the merged lane direction to be performed by the merged lane direction identification unit 22 of FIG. 1. Note that, in FIG. 8, a case is exemplified in which a left lane in the road is the merging lane and a center lane is the merged lane.

When separation lines on both sides of the own vehicle driving lane are focused, as can be seen from FIG. 8, the line type of one of the separation lines on both sides of the merging lane that is on the merged lane side, namely, the line type of the separation line separating the merging lane from the merged lane is a broken line, whereas the line type of the other of the separation lines on both sides is a solid line.

Thus, when the detected line type of one of the separation lines on both sides of the own vehicle driving lane is a broken line, whereas the other is a solid line, the merged lane direction identification unit 22 determines that the own vehicle driving lane has a possibility of being the merging lane and identifies the direction toward the separation line having the line type of a broken line as the merged lane direction.

On the other hand, when the line types of the separation lines on both sides of a lane are both broken lines or solid lines, the lane is not the merging lane. Thus, when the detected line types of the separation lines on both sides of the own vehicle driving lane are both broken lines or solid lines, the merged lane direction identification unit 22 determines that the own vehicle driving lane has no possibility of being the merging lane and identifies "none" as the merged lane direction.

In this way, the merged lane direction identification unit 22 can identify the merged lane direction with respect to the own vehicle driving lane based on the combination of the line types of the separation lines on both sides of the own vehicle driving lane.

Note that, as the method of identifying the merged lane direction to be performed by the merged lane direction identification unit 22, the merged lane direction may be identified through identification of which lane of lanes in the road the own vehicle driving lane on which the own vehicle is currently traveling is, based on positional information with an accuracy of several centimeters that is acquired from a GPS or a quasi-zenith satellite and map information that is stored in the storage unit in advance.

The own vehicle driving lane determination unit 23 determines whether or not the own vehicle driving lane is the merging lane based on the merging lane information input from the merging lane identification unit 21 and the merged lane direction information input from the merged lane direction identification unit 22.

In this case, for example, the following method is conceivable as a method of determining whether or not the own vehicle driving lane is the merging lane to be performed by the own vehicle driving lane determination unit 23.

That is, when the merged lane direction contained in the merged lane direction information is right, it follows that the own vehicle driving lane is the leftmost lane, whereas when the merged lane direction contained in the merged lane direction information is left, it follows that the own vehicle driving lane is the rightmost lane. Thus, the own vehicle driving lane determination unit 23 determines the position of the own vehicle driving lane based on the merged lane direction.

Then, when the position of the own vehicle driving lane is the same as the position of the merging lane contained in the merging lane information, the own vehicle driving lane determination unit 23 determines that the own vehicle driving lane is the merging lane. On the other hand, when the position of the own vehicle driving lane is not the same as the position of the merging lane contained in the merging lane information, the own vehicle driving lane determination unit 23 determines that the own vehicle driving lane is not the merging lane.

The own vehicle driving lane determination unit 23 generates a result of determining whether or not the own vehicle driving lane is the merging lane as own vehicle driving lane information, and outputs this own vehicle driving lane information to the own vehicle driving control unit 24.

The vehicle condition detection unit 3 detects various kinds of signals indicating vehicle conditions such as a vehicle speed, a steering wheel steering angle, and a blinker signal indicating an ON/OFF switch state of a blinker of the own vehicle, and outputs this detection result as vehicle condition information.

The forward vehicle detection unit 4 detects whether or not there is any forward vehicle such as a four-wheel vehicle or a two-wheel vehicle that is traveling ahead of the own vehicle, and also detects a distance between the own vehicle and the forward vehicle, and other such information. The forward vehicle detection unit 4 outputs this detection result as forward vehicle information. Note that, the forward vehicle detection unit 4 is formed of, for example, one or a plurality of radars mounted on a front body of the vehicle. Further, for example, a milliwave radar, an ultrasonic radar, or a laser radar may be used as the radar.

The own vehicle driving control unit 24 controls the driving of the own vehicle in accordance with the vehicle condition information acquired from the vehicle condition detection unit 3 and the own vehicle driving lane information input from the own vehicle driving lane determination unit 23. The own vehicle driving control unit 24 includes a vehicle speed control unit 25 as a specific example.

The vehicle speed control unit 25 performs vehicle speed control in accordance with the vehicle condition information acquired from the vehicle condition detection unit 3, the forward vehicle information acquired from the forward vehicle detection unit 4, and the own vehicle driving lane information input from the own vehicle driving lane determination unit 23 such that the distance between the own vehicle and the forward vehicle is kept at a certain length or longer and at the same time the vehicle speed is maintained at a set constant drive speed.

Specifically, when the own vehicle driving lane is determined not to be the merging lane in the determination result contained in the own vehicle driving lane information, the vehicle speed control unit 25 determines control amounts for performing the vehicle speed control so as to keep the distance between the own vehicle and the forward vehicle at a certain length or longer and at the same time maintain the vehicle speed at the set constant drive speed.

That is, in a case where the vehicle speed control is performed, the vehicle speed control unit 25 determines control amounts for realizing acceleration when the own vehicle needs to be accelerated, whereas the vehicle speed control unit 25 determines control amounts for realizing deceleration when the own vehicle needs to be decelerated.

On the other hand, when the own vehicle driving lane is determined to be the merging lane in the determination result contained in the own vehicle driving lane information, the vehicle speed control unit 25 determines control amounts for performing the vehicle speed control on the premise that the acceleration operation of the own vehicle is prohibited.

That is, even when the own vehicle needs to be accelerated such as when the distance between vehicles is kept at a certain length or longer or when the vehicle speed is slower than the set constant drive speed, the vehicle speed control unit 25 prohibits the acceleration operation of the own vehicle and determines control amounts for keeping the current vehicle speed. When the own vehicle needs to be decelerated, the vehicle speed control unit 25 determines control amounts for realizing deceleration.

Note that, the vehicle speed control unit 25 may be configured to perform vehicle speed control in accordance with the vehicle condition information acquired from the vehicle condition detection unit 3 and the own vehicle driving lane information input from the own vehicle driving lane determination unit 23 such that the vehicle speed is maintained at a set constant drive speed. Also in this case, when the own vehicle driving lane is determined to be the merging lane, the control amounts for performing the vehicle speed control are determined on the premise that the acceleration operation of the own vehicle is prohibited in the same manner as described above.

Further, the vehicle speed control unit 25 determines whether or not the own vehicle has completed lane change from the merging lane to the merged lane based on the position of the own vehicle driving lane contained in the own vehicle driving lane information, the steering wheel steering angle signal or the blinker signal contained in the vehicle condition information, and the positions of the separation lines on both sides of the own vehicle driving lane contained in the separation line information.

The prohibition of the acceleration operation is continued until the own vehicle driving lane is determined not to be the merging lane or until the lane change is determined to have completed.

The engine control unit 5 controls an engine so as to achieve a torque amount of the engine corresponding to the control amount determined by the vehicle speed control unit 25.

The brake control unit 6 controls a brake so as to achieve a brake strength corresponding to the control amount determined by the vehicle speed control unit 25.

Figure 9:
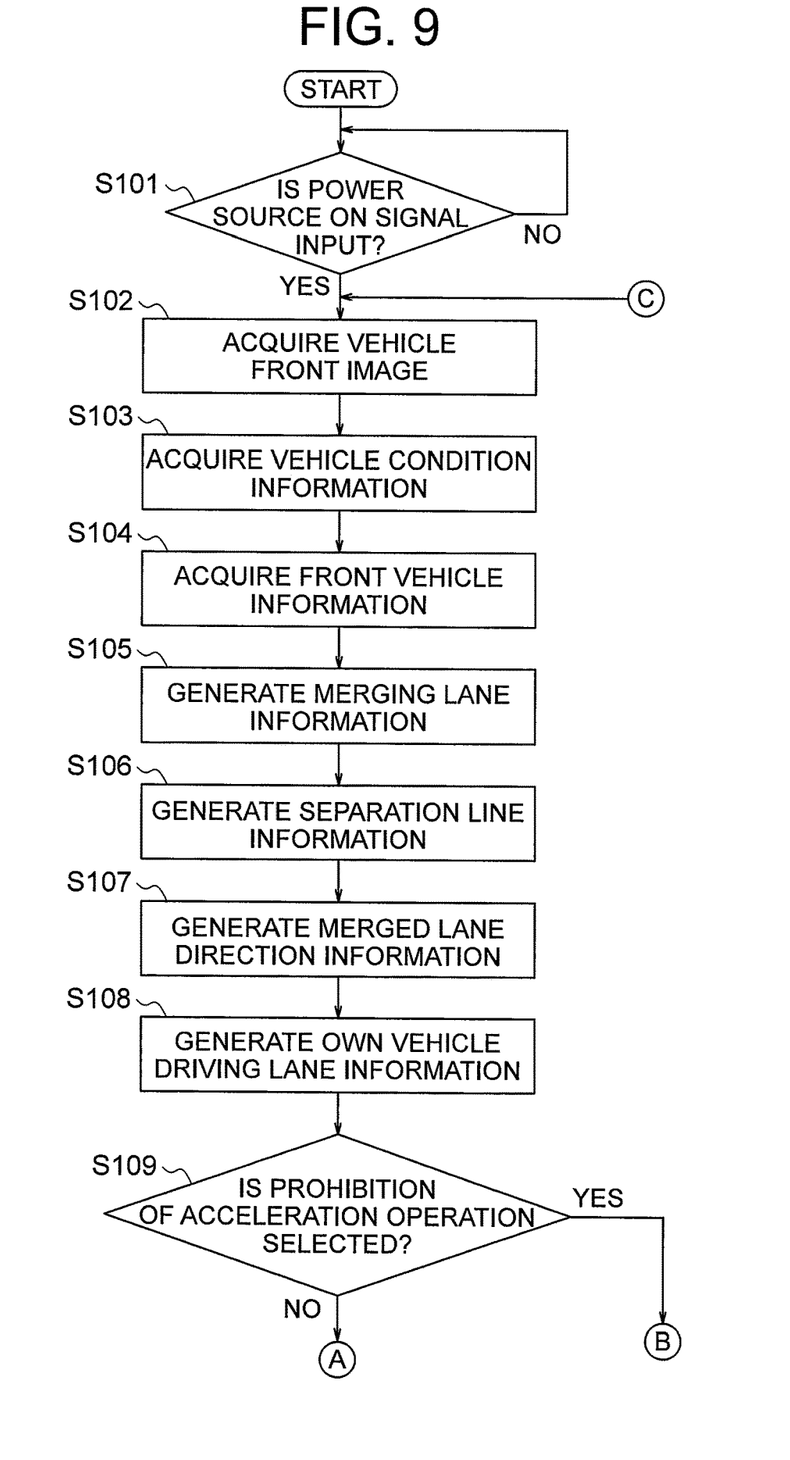
FIG. 9 is a flowchart for illustrating a series of operations to be performed by the driving assistance apparatus according to the first embodiment of the present invention.
Figure 10:
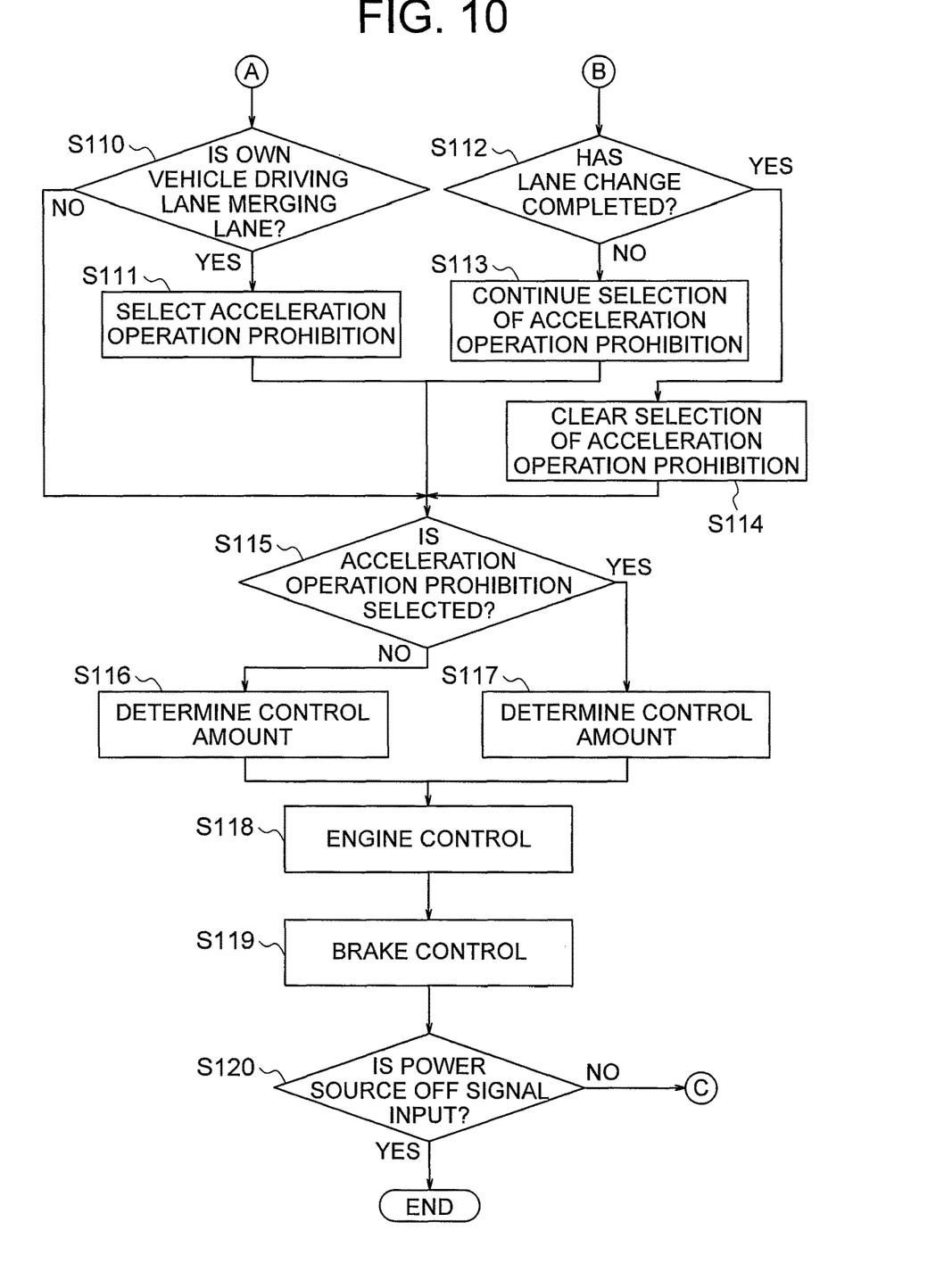
FIG. 10 is a flowchart for illustrating the series of operations to be performed by the driving assistance apparatus according to the first embodiment of the present invention.

Next, a description is given of an operation of the driving assistance apparatus according to the first embodiment with reference to FIG. 9 and FIG. 10. FIG. 9 and FIG. 10 are flowcharts for illustrating a series of operations of the driving assistance apparatus according to the first embodiment of the present invention. Note that, FIG. 9 and FIG. 10 are two separate figures that form one flowchart, and thus the description part of FIG. 10 follows after the description part of FIG. 9.

In Step S101, the driving assistance control unit 2 determines whether or not a power source ON signal is input. In Step S101, when the power source ON signal is input, the driving assistance control unit 2 proceeds to Step S102, whereas when the power source ON signal is not input, the driving assistance control unit 2 executes processing of Step S101 again. Note that, the power source ON signal is input, for example, when the power source of the driving assistance apparatus is switched from the OFF state to the ON state.

In Step S102, the merging lane identification unit 21 and the merged lane direction identification unit 22 acquire the vehicle front image from the image pickup unit 1, and the processing proceeds to Step S103.

In Step S103, the vehicle speed control unit 25 acquires the vehicle condition information from the vehicle condition detection unit 3, and proceeds to Step S104.

In Step S104, the vehicle speed control unit 25 acquires the forward vehicle information from the forward vehicle detection unit 4, and the processing proceeds to Step S105.

In Step S105, the merging lane identification unit 21 generates the merging lane information based on the vehicle front image acquired in Step S102, and the processing proceeds to Step S106.

In Step S106, the merged lane direction identification unit 22 generates the separation line information based on the vehicle front image acquired in Step S102, and proceeds to Step S107.

In Step S107, the merged lane direction identification unit 22 generates the merged lane direction information based on the line types of the separation lines on both sides of the own vehicle driving lane contained in the separation line information generated in Step S106, and the processing proceeds to Step S108.

In Step S108, the own vehicle driving lane determination unit 23 generates the own vehicle driving lane information based on the merging lane information generated in Step S105 and the merged lane direction information generated in Step S107.

In Step S109, the vehicle speed control unit 25 determines whether or not prohibition of the acceleration operation is currently selected. In Step S109, when the prohibition of the acceleration operation is not selected, the vehicle speed control unit 25 proceeds to Step S110, whereas when the prohibition of the acceleration operation is selected, the vehicle speed control unit 25 proceeds to Step S112.

In Step S110, the vehicle speed control unit 25 determines whether or not the own vehicle driving lane is the merging lane based on the determination result contained in the own vehicle driving lane information generated in Step S108. In Step S110, when the own vehicle driving lane is the merging lane, the vehicle speed control unit 25 proceeds to Step S111, whereas when the own vehicle driving lane is not the merging lane, the vehicle speed control unit 25 proceeds to Step S115.

In Step S111, the vehicle speed control unit 25 selects prohibition of the acceleration operation, and proceeds to Step S115.

In Step S112, the vehicle speed control unit 25 determines whether or not the lane change from the merging lane to the merged lane has completed based on the position of the own vehicle driving lane contained in the own vehicle driving lane information generated in Step S108, the steering wheel steering angle signal or the blinker signal contained in the vehicle condition information acquired in Step S103, and the positions of the separation lines on both sides of the own vehicle driving lane contained in the separation line information generated in Step S106. In Step S112, when the lane change has not completed, the vehicle speed control unit 25 proceeds to Step S113, whereas when the lane change has completed, the vehicle speed control unit 25 proceeds to Step S114.

In Step S113, the vehicle speed control unit 25 continues the selection of prohibition of the acceleration operation, and proceeds to Step S115.

In Step S114, the vehicle speed control unit 25 clears the selection of prohibition of the acceleration operation, and proceeds to Step S115.

In Step S115, the vehicle speed control unit 25 determines whether or not the prohibition of the acceleration operation is currently selected. In Step S115, when the prohibition of the acceleration operation is not selected, the vehicle speed control unit 25 proceeds to Step S116, whereas when the prohibition of the acceleration operation is selected, the vehicle speed control unit 25 proceeds to Step S117.

In Step S116, the vehicle speed control unit 25 determines control amounts for performing the vehicle speed control based on the vehicle speed contained in the vehicle condition information acquired in Step S103 and the forward vehicle information acquired in Step S104 such that the distance between the own vehicle and the forward vehicle is kept at a certain length or longer and at the same time the vehicle speed is maintained at a set constant drive speed, and the processing proceeds to Step S118. At this stage, in a case where the prohibition of the acceleration operation is not selected, the vehicle speed control unit 25 determines control amounts for realizing acceleration when the own vehicle needs to be accelerated, whereas the vehicle speed control unit 25 determines control amounts for realizing deceleration when the own vehicle needs to be decelerated.

In Step S117, the vehicle speed control unit 25 determines control amounts for performing the vehicle speed control based on the vehicle speed contained in the vehicle condition information acquired in Step S103 and the forward vehicle information acquired in Step S104 such that the distance between the own vehicle and the forward vehicle is kept at a certain length or longer and at the same time the vehicle speed is maintained at a set constant drive speed, and the processing proceeds to Step S118. At this stage, in a case where the prohibition of the acceleration operation is selected, the vehicle speed control unit 25 determines control amounts for keeping the current vehicle speed without performing the acceleration operation even when the own vehicle needs to be accelerated, whereas the vehicle speed control unit 25 determines control amounts for realizing deceleration when the own vehicle needs to be decelerated.

In Step S118, the engine control unit 5 controls the engine such that the engine has torque whose amount corresponds to the control amount determined in Step S116 or in Step S117, and the processing proceeds to Step S119.

In Step S119, the brake control unit 6 controls the brake such that the brake strength corresponds to the control amount determined in Step S116 or in Step S117, and the processing proceeds to Step S120.

In Step S120, the driving assistance control unit 2 determines whether or not a power source OFF signal is input. In Step S120, when the power source OFF signal is input, the driving assistance control unit 2 ends the series of processing steps, whereas when the power source OFF signal is not input, the driving assistance control unit 2 returns to Step S102 and executes processing from Step S102 again. Note that, the power source OFF signal is input, for example, when the power source of the driving assistance apparatus is switched from the ON state to the OFF state.

As described above, according to the first embodiment, the driving assistance apparatus is configured to determine whether or not the own vehicle driving lane is the merging lane based on the result of identifying the merging lane from a lane reduction sign detected in a vehicle front image and the result of identifying the merged lane direction with respect to the own vehicle driving lane from separation lines on both sides of the own vehicle driving lane that are detected in the vehicle front image, and to control the driving of the own vehicle in accordance with the determination result and the vehicle condition information of the own vehicle. With this, it is possible to provide appropriate driving assistance to the driver of a vehicle traveling on a merging lane.

Further, as one way of controlling the driving of the own vehicle, the driving assistance apparatus is configured to perform the vehicle speed control such that the vehicle speed contained in the vehicle condition information is the set speed, and when the own vehicle driving lane is determined to be the merging lane, prohibit the acceleration operation of the own vehicle in the vehicle speed control. With this, it is possible to prevent the own vehicle from performing the acceleration operation despite the lane reduction during traveling on the merging lane.

Further, as another way of controlling the driving of the own vehicle, the driving assistance apparatus is configured to perform the vehicle speed control such that the distance between the own vehicle and the forward vehicle contained in the forward vehicle information is kept at a certain length or longer and at the same time the vehicle speed contained in the vehicle condition information is maintained at a set speed, and when the own vehicle driving lane is determined to be the merging lane, prohibit the acceleration operation of the own vehicle in the vehicle speed control. With this, it is possible to prevent the own vehicle from performing the acceleration operation during traveling on the merging lane when the forward vehicle has changed the lane and there is no vehicle ahead.

Second Embodiment

In a second embodiment of the present invention, a description is given of a driving assistance apparatus including the own vehicle driving control unit 24 having a configuration different from that of the first embodiment. Note that, in the second embodiment, the description of the same points as those of the first embodiment is omitted, and points different from those of the first embodiment are mainly described.

Figure 11:
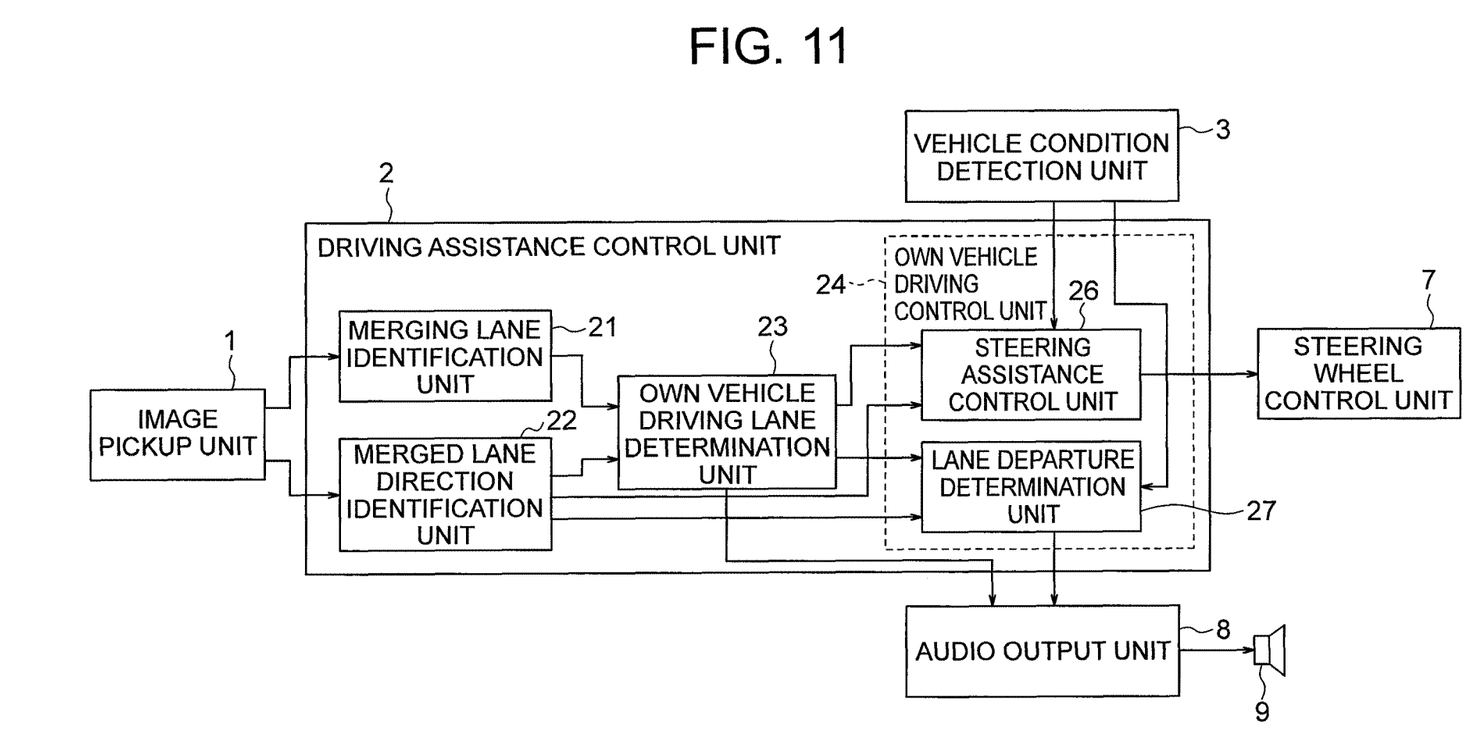
FIG. 11 is an overall block diagram for illustrating a driving assistance apparatus according to a second embodiment of the present invention.

FIG. 11 is an overall block diagram for illustrating a driving assistance apparatus according to the second embodiment of the present invention. The driving assistance apparatus of FIG. 11 includes the image pickup unit 1, the driving assistance control unit 2, and the vehicle condition detection unit 3. In FIG. 11, a steering wheel control unit 7, an audio output unit 8, and a speaker 9 to be controlled by the driving assistance control unit 2 are illustrated together with the above-mentioned components.

The driving assistance control unit 2 includes the merging lane identification unit 21, the merged lane direction identification unit 22, the own vehicle driving lane determination unit 23, and the own vehicle driving control unit 24. Further, the own vehicle driving control unit 24 is formed of a steering assistance control unit 26 and a lane departure determination unit 27.

The own vehicle driving lane determination unit 23 generates the own vehicle driving lane information in the same way as in the first embodiment, and outputs an alarm instruction signal to the audio output unit 8 when determining that the own vehicle driving lane is the merging lane.

Thus, it is possible for the driver to change the lane in an unhurried way by configuring the own vehicle driving lane determination unit 23 such that when the own vehicle driving lane is determined to be the merging lane, the driver is warned of this determination.

The steering assistance control unit 26 provides steering assistance corresponding to a mode based on the vehicle condition information acquired from the vehicle condition detection unit 3, the separation line information input from the merged lane direction identification unit 22, and the own vehicle driving lane information input from the own vehicle driving lane determination unit 23.

Specifically, the steering assistance control unit 26 determines a steering force of the steering wheel for realizing steering assistance control in a normal mode when the own vehicle driving lane is determined not to be the merging lane in the determination result contained in the own vehicle driving lane information.

That is, the steering assistance control unit 26 determines a steering force of the steering wheel for realizing steering assistance that intends to move the own vehicle back to the center side of the own vehicle driving lane when the own vehicle travels toward any one of separation lines on both sides of the own vehicle driving lane so that the own vehicle keeps traveling between the separation lines on both sides thereof.

On the other hand, the steering assistance control unit 26 determines a steering force of the steering wheel for realizing steering assistance control in a specified mode when the own vehicle driving lane is determined to be the merging lane in the determination result contained in the own vehicle driving lane information.

That is, the steering assistance control unit 26 determines a steering force of the steering wheel to be invalid so as not to provide the steering assistance that intends to move the own vehicle back to the center side of the own vehicle driving lane, even when the own vehicle travels toward the merged lane side, which is one side of the separation lines on both sides of the own vehicle driving lane. On the other hand, the steering assistance control unit 26 determines a steering force of the steering wheel for realizing steering assistance that intends to move the own vehicle back to the center side of the own vehicle driving lane when the own vehicle travels toward the other side of the separation lines on both sides of the own vehicle driving lane.

In this way, the steering assistance control unit 26 performs the steering assistance control such that the own vehicle keeps traveling on the own vehicle driving lane. Further, when the own vehicle driving lane is determined to be the merging lane as a result of determination by the own vehicle driving lane determination unit 23, the steering assistance control unit 26 determines whether or not to perform the steering assistance control depending on toward which side of the separation lines on both sides of the own vehicle driving lane the own vehicle travels.

When the own vehicle travels toward the merged lane side, which is one side of the separation lines on both sides of the own vehicle driving lane, the steering assistance control unit 26 does not perform the steering assistance control. On the other hand, when the own vehicle travels toward the other side of the separation lines on both sides of the own vehicle driving lane, the steering assistance control unit 26 performs the steering assistance control.

Note that, the steering assistance control in the specified mode is continued until the own vehicle driving lane is determined not to be the merging lane or until the lane change is determined to have completed.

The lane departure determination unit 27 performs a lane departure determination corresponding to a mode based on the vehicle condition information acquired from the vehicle condition detection unit 3, the separation line information input from the merged lane direction identification unit 22, and the own vehicle driving lane information input from the own vehicle driving lane determination unit 23.

Specifically, the lane departure determination unit 27 performs a lane departure determination in a normal mode when the own vehicle driving lane is determined not to be the merging lane in the determination result contained in the own vehicle driving lane information.

That is, the lane departure determination unit 27 determines whether or not there is a departure possibility of the own vehicle departing from the own vehicle driving lane, and when determining that there is a departure possibility, outputs an alarm instruction signal to the audio output unit 8.

On the other hand, the lane departure determination unit 27 performs a lane departure determination in a specified mode when the own vehicle driving lane is determined to be the merging lane in the determination result contained in the own vehicle driving lane information.

That is, the lane departure determination unit 27 determines, in the same way as in the normal mode, whether or not there is a departure possibility of the own vehicle departing from the own vehicle driving lane. However, even in a case where the lane departure determination unit 27 determines that there is a departure possibility, the lane departure determination unit 27 does not output an alarm instruction signal to the audio output unit 8 when the own vehicle departs from the own vehicle driving lane toward a separation line on the merged lane side of the separation lines on both sides of the own vehicle driving lane.

In this way, the lane departure determination unit 27 determines whether or not there is a departure possibility of the own vehicle departing from the own vehicle driving lane, and when determining that there is a departure possibility, gives a warning to the driver. Further, when the own vehicle driving lane is determined to be the merging lane as a result of determination by the own vehicle driving lane determination unit 23, the lane departure determination unit 27 determines whether or not to give a warning depending on toward which side of the separation lines on both sides of the own vehicle driving lane there is a possibility of the own vehicle departing from the own vehicle driving lane.

That is, when there is a possibility of the own vehicle departing from the own vehicle driving lane toward the merged lane side, which is one side of the separation lines on both sides of the own vehicle driving lane, the lane departure determination unit 27 does not give a warning. On the other hand, when there is a possibility of the own vehicle departing from the own vehicle driving lane toward the other side of the separation lines on both sides of the own vehicle driving lane, the lane departure determination unit 27 gives a warning.

Note that, the lane departure determination in the specified mode is continued until the own vehicle driving lane is determined not to be the merging lane or until the lane change is determined to have completed.

The steering wheel control unit 7 controls the steering wheel so as to achieve the steering force of the steering wheel determined by the steering assistance control unit 26.

When an alarm instruction signal is input from at least one of the own vehicle driving lane determination unit 23 or the lane departure determination unit 27, the audio output unit 8 outputs a warning sound using the speaker 9.

Figure 12:
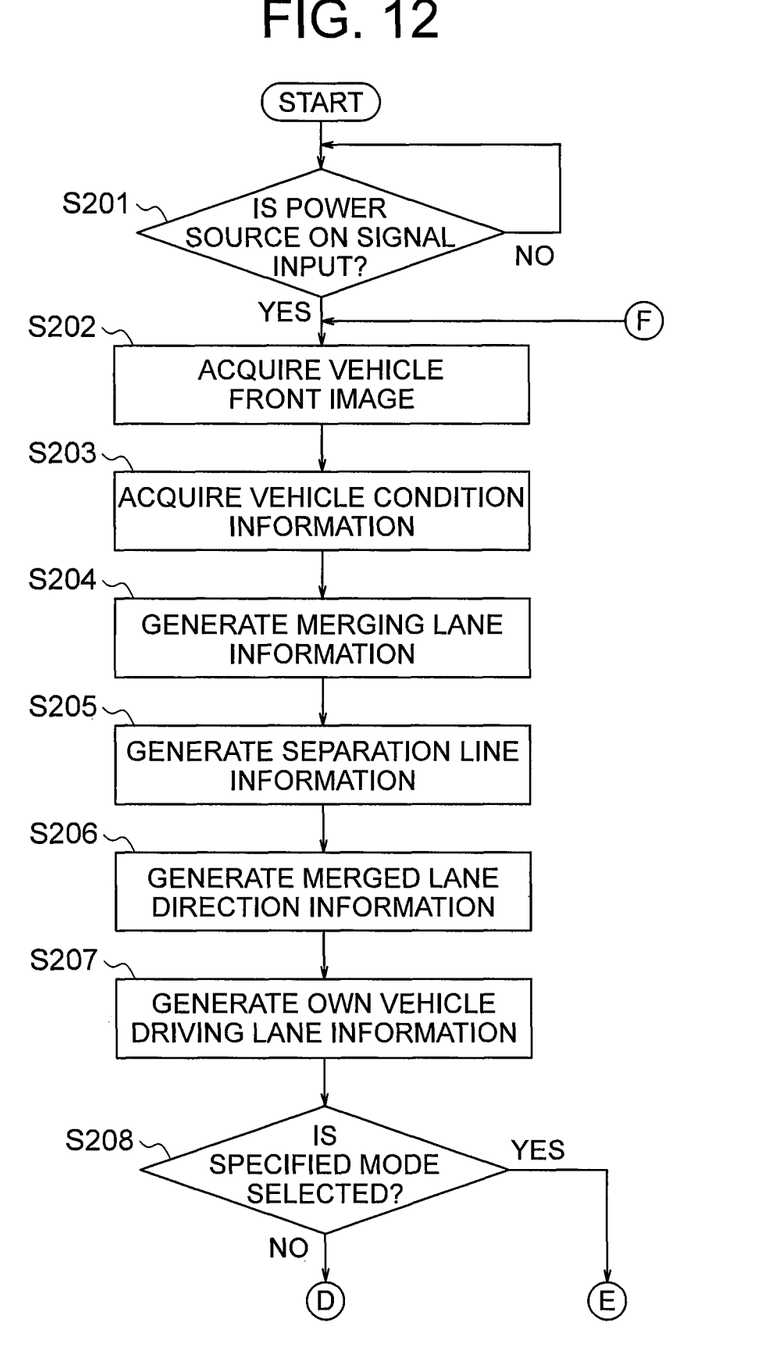
FIG. 12 is a flowchart for illustrating a series of operations to be performed by the driving assistance apparatus according to the second embodiment of the present invention.
Figure 13:
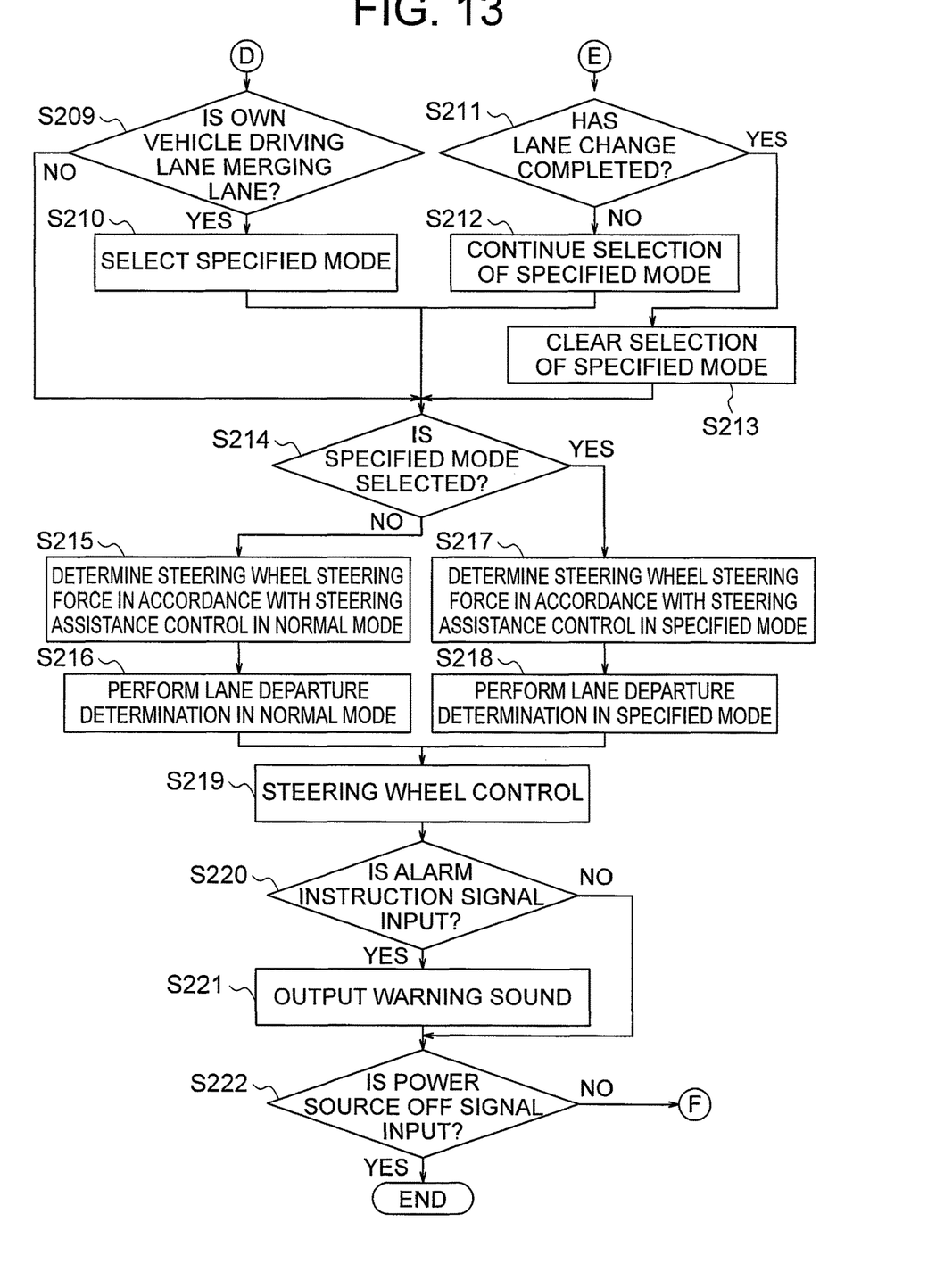
FIG. 13 is a flowchart for illustrating the series of operations to be performed by the driving assistance apparatus according to the second embodiment of the present invention.

Next, a description is given of an operation of the driving assistance apparatus according to the second embodiment with reference to FIG. 12 and FIG. 13. FIG. 12 and FIG. 13 are flowcharts for illustrating a series of operations of the driving assistance apparatus according to the second embodiment of the present invention.

Note that, FIG. 12 and FIG. 13 are two separate figures that form one flowchart, and thus the description part of FIG. 13 follows after the description part of FIG. 12. Further, each processing step of from Step S201 to Step S207 in FIG. 12 is the same as that of from Step S101 to Step S103 and from Step S105 to Step S108 in FIG. 9. Thus, a description thereof is omitted and processing steps from Step S208 are described.

In Step S208, the own vehicle driving control unit 24 determines whether or not the specified mode is currently selected. In Step S208, when the specified mode is not selected, the own vehicle driving control unit 24 proceeds to Step S209, whereas when the specified mode is selected, the own vehicle driving control unit 24 proceeds to Step S211.

In Step S209, the own vehicle driving control unit 24 determines whether or not the own vehicle driving lane is the merging lane based on the determination result contained in the own vehicle driving lane information generated in Step S207. In Step S209, when the own vehicle driving lane is the merging lane, the own vehicle driving control unit 24 proceeds to Step S210, whereas when the own vehicle driving lane is not the merging lane, the own vehicle driving control unit 24 proceeds to Step S214.

In Step S210, the own vehicle driving control unit 24 selects the specified mode and proceeds to Step S214.

In Step S211, the own vehicle driving control unit 24 determines whether or not the lane change from the merging lane to the merged lane has completed based on the position of the own vehicle driving lane contained in the own vehicle driving lane information generated in Step S207, the steering wheel steering angle signal or the blinker signal contained in the vehicle condition information acquired in Step S203, and the positions of the separation lines on both sides of the own vehicle driving lane contained in the separation line information generated in Step S205. In Step S211, when the lane change has not completed, the own vehicle driving control unit 24 proceeds to Step S212, whereas when the lane change has completed, the own vehicle driving control unit 24 proceeds to Step S213.

In Step S212, the own vehicle driving control unit 24 continues the selection of the specified mode and proceeds to Step S214.

In Step S213, the own vehicle driving control unit 24 clears the selection of the specified mode and proceeds to Step S214.

In Step S214, the own vehicle driving control unit 24 determines whether or not the specified mode is currently selected. In Step S214, when the specified mode is not selected, the own vehicle driving control unit 24 proceeds to Step S215, whereas when the specified mode is selected, the own vehicle driving control unit 24 proceeds to Step S217.

In Step S215, the own vehicle driving control unit 24 determines a steering force of the steering wheel for performing the steering assistance control in the normal mode, and proceeds to Step S216.

In Step S216, the own vehicle driving control unit 24 performs the lane departure determination in the normal mode, and the processing proceeds to Step S219.

In Step S217, the own vehicle driving control unit 24 determines a steering force of the steering wheel for performing the steering assistance control in the specified mode, and proceeds to Step S218.

In Step S218, the own vehicle driving control unit 24 performs the lane departure determination in the specified mode, and the processing proceeds to Step S219.

In Step S219, the steering wheel control unit 7 controls the steering wheel so as to achieve the steering force of the steering wheel determined in Step S215 or Step S217, and the processing proceeds to Step S220.

In Step S220, the audio output unit 8 determines whether or not the alarm instruction signal is input. In Step S220, when the alarm instruction signal is input, the audio output unit 8 proceeds to Step S221, whereas when the alarm instruction signal is not input, the audio output unit 8 proceeds to Step S222.

In Step S221, the audio output unit 8 outputs a warning sound using the speaker 9, and the processing proceeds to Step S222.

In Step S222, the driving assistance control unit 2 determines whether or not the power source OFF signal is input. In Step S222, when the power source OFF signal is input, the driving assistance control unit 2 ends the series of processing steps, whereas when the power source OFF signal is not input, the driving assistance control unit 2 returns to Step S202 and executes processing from Step S202 again.

As described above, according to the second embodiment, the driving assistance apparatus is configured to determine, when the own vehicle driving lane is determined to be the merging lane, whether or not to perform the steering assistance control depending on toward which side of the separation lines on both sides of the own vehicle driving lane the own vehicle travels. With this, it is possible to continue to perform appropriate steering assistance control for the driver of a vehicle traveling on a merging lane because the steering assistance control is not performed when the vehicle traveling on the merging lane merges into a merged lane from the merging lane.

Further, the driving assistance apparatus is configured to determine, when the own vehicle driving lane is determined to be the merging lane, whether or not to give a warning depending on toward which side of the separation lines on both sides of the own vehicle driving lane there is a possibility of the own vehicle departing from the own vehicle driving lane. With this, it is possible to continue to give an appropriate warning to the driver of a vehicle traveling on a merging lane because the warning is not given to the driver when the vehicle traveling on the merging lane merges into a merged lane from the merging lane.

Note that, descriptions are given of the first and second embodiments individually, but configuration examples described respectively in the first and second embodiments can arbitrary be combined.

What is claimed is:

1. A driving assistance apparatus, comprising:
a processor configured to:
determine whether or not an own vehicle driving lane on which an own vehicle is traveling is a merging lane; and
prohibit, in response to the own vehicle driving lane being determined to be the merging lane, an acceleration operation of the own vehicle.

2. The driving assistance apparatus according to claim 1, further comprising a camera configured to pick up an image result of a periphery of the own vehicle traveling on the own vehicle driving lane,
wherein the processor is further configured to determine whether or not the own vehicle driving lane is the merging lane, based on the image result picked up by the camera.

3. The driving assistance apparatus according to claim 2, wherein the processor is further configured to:
detect a lane reduction sign in the image result picked up by the camera; and
determine whether or not the own vehicle driving lane is the merging lane, based on the detected lane reduction sign.

4. The driving assistance apparatus according to claim 2, wherein the processor is further configured to:
detect a lane reduction sign in the image result picked up by the camera;
detect separation lines on both sides of the own vehicle driving lane in the image result picked up by the camera; and
determine whether or not the own vehicle driving lane is the merging lane, based on the detected lane reduction sign and the detected separation lines.

5. The driving assistance apparatus according to claim 1, wherein the processor is further configured to:
determine whether or not a lane change from the merging lane to another lane is completed;
in response to the lane change being determined to be completed, clear the acceleration operation of the own vehicle from being prohibited; and
in response to the lane change being determined to be not completed, continue prohibiting of the acceleration operation of the own vehicle.

6. The driving assistance apparatus according to claim 5, wherein the processor is further configured to determine whether or not the lane change from the merging lane to the other lane is completed, based on a position of the own vehicle driving lane, a steering wheel steering angle, a blinker signal and positions of separation lines on both sides of the own vehicle driving lane.

7. The driving assistance apparatus according to claim 1, wherein the processor is further configured to perform vehicle speed control to maintain a vehicle speed of the own vehicle, at a set speed.

8. The driving assistance apparatus according to claim 7, wherein the processor is further configured to:
detect forward vehicle information of a forward vehicle traveling ahead of the own vehicle; and
perform the vehicle speed control to keep a distance between the own vehicle and the forward vehicle at a length or longer, while maintaining the vehicle speed at the set speed.

9. A driving assistance method, comprising:
determining whether or not an own vehicle driving lane on which an own vehicle is traveling is a merging lane; and
prohibiting, in response to the own vehicle driving lane being determined to be the merging lane, an acceleration operation of the own vehicle.

10. The driving assistance method according to claim 9, further comprising picking up an image result of a periphery of the own vehicle traveling on the own vehicle driving lane,
wherein the determining comprises determining whether or not the own vehicle driving lane is the merging lane, based on the image result picked up.

11. The driving assistance method according to claim 10, further comprising detecting a lane reduction sign in the image result picked up,
wherein the determining further comprises determining whether or not the own vehicle driving lane is the merging lane, based on the detected lane reduction sign.

12. The driving assistance method according to claim 10, further comprising:
detecting a lane reduction sign in the image result picked up; and
detecting separation lines on both sides of the own vehicle driving lane in the image result picked up,
wherein the determining comprises further determining whether or not the own vehicle driving lane is the merging lane, based on the detected lane reduction sign and the detected separation lines.

13. The driving assistance method according to claim 9, further comprising:
determining whether or not a lane change from the merging lane to another lane is completed;
clearing, in response to the lane change being determined to be completed, the acceleration operation of the own vehicle from being prohibited; and
continuing, in response to the lane change being determined to be not completed, prohibiting of the acceleration operation of the own vehicle.

14. The driving assistance method according to claim 13, wherein the determining comprises determining whether or not the lane change from the merging lane to the other lane is completed, based on a position of the own vehicle driving lane, a steering wheel steering angle, a blinker signal and positions of separation lines on both sides of the own vehicle driving lane.

* * * * *